United States Patent [19]

Hanning et al.

[11] Patent Number: 5,586,569
[45] Date of Patent: Dec. 24, 1996

[54] PNEUMATIC PRESSURE REGULATOR

[75] Inventors: John R. Hanning, Wake Forest; Daniel C. Olmsted, Youngsville, both of N.C.

[73] Assignee: Parker-Hannifin Corporation, Cleveland, Ohio

[21] Appl. No.: 508,306

[22] Filed: Jul. 27, 1995

[51] Int. Cl.$^6$ ............................................. G05D 16/02
[52] U.S. Cl. ................................. 137/116.5; 137/484.8; 137/505; 137/505.37
[58] Field of Search ........................... 137/505, 505.37, 137/484.8, 116.5

[56] References Cited

U.S. PATENT DOCUMENTS

| | | | |
|---|---|---|---|
| 2,664,674 | 1/1954 | Niesemann | 137/116.5 |
| 2,707,966 | 5/1955 | Taplin | 137/484.8 X |
| 3,064,670 | 11/1962 | Peras | 137/116.5 |
| 3,247,865 | 4/1966 | Doyle | 137/484.8 |
| 3,926,208 | 12/1975 | Hoffman | 137/484.8 |
| 4,272,368 | 6/1981 | Foord | 210/90 |
| 4,366,717 | 1/1983 | Foord et al. | 73/744 |
| 4,719,940 | 1/1988 | Beavers | 137/505.42 X |

FOREIGN PATENT DOCUMENTS

| | | | |
|---|---|---|---|
| 3542810 | 5/1987 | Germany | 137/505 |
| 4-78390 | 7/1990 | Japan | 137/505 |

OTHER PUBLICATIONS

Wilkerson Corporation—catalogue entitled "New Complete Modular Air Preparation System", front & back covers and pp. 21–31 (1994).
The Aro Corporation—brochure entitled "Aro Modular Air 2000 F–R–L", front and back covers and pp. 10, 11, 14 & 15 (1991).
Arrow Pneumatics, Inc.—catalogue entitled "Filters, Regulators, Lubricators, Accessories", front and back covers and pp. 3–6 and 16–25.
Dia–Com Corporation—booklet entitled "Diaphragm Design Guidebook" (1994).
Bellofram, manual entitled "Diaphragm Design Manual" (1988).
Parker–Hannifin, Maintenance Bulletin 0499MI, Form CR–702 (1969).
Norgren, Installation and Maintenance Instructions for General Purpose Pressure Regulator, NNM–242 (1989).
Watts Fluidair, leaflet entitled "QIX Regulators Type R20/R21". (no date).

Primary Examiner—Stephen M. Hepperle
Attorney, Agent, or Firm—Renner, Otto, Boisselle & Sklar

[57] ABSTRACT

A fluid pressure regulator having various features that contribute to a low cost regulator that is easy to assemble from components that require less machining than existing regulator designs of comparable performance. The invention is characterized by (i) a fluid pressure regulator of closed bottom design that has a flow path similar to a conventional open bottom design, with other attendant advantages arising from the closed bottom design; (ii) a slant seal between a main body including the inlet and outlet ports and an insert body closing an open end of an intersecting chamber in the main body in which the valve element and valve seat are located; (iii) the valve seat insert having a wall portion separating the main flow path in the main body of the housing from a control chamber for the valve element and the wall portion including therein an aspirating passage for connecting the control chamber a portion of the main flow passage downstream of the valve seat; (iv) a diaphragm piston assembly including an axially elongated mounting bead which hold the assembly to a bonnet body with other components of the bonnet retained in the bonnet body for easy assembly of the bonnet to the main body of the regulator housing; and (v) a relief type regulator that has during forward flow low hysteresis arising from use of a rolling diaphragm and a unique vent seal that dampens vibrations to eliminate unwanted noise that might otherwise arise.

21 Claims, 4 Drawing Sheets

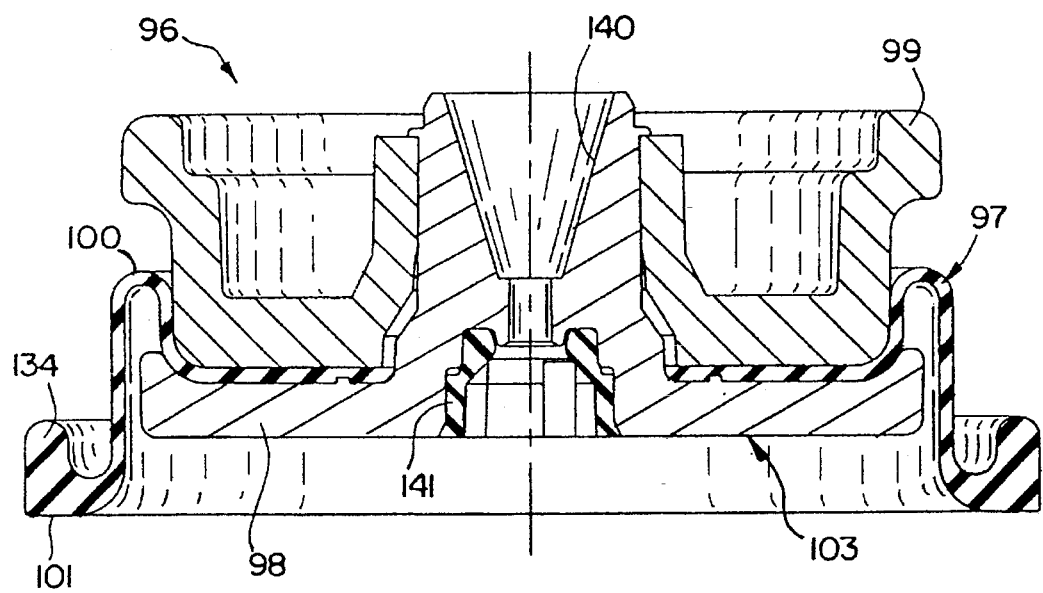
FIG. 4
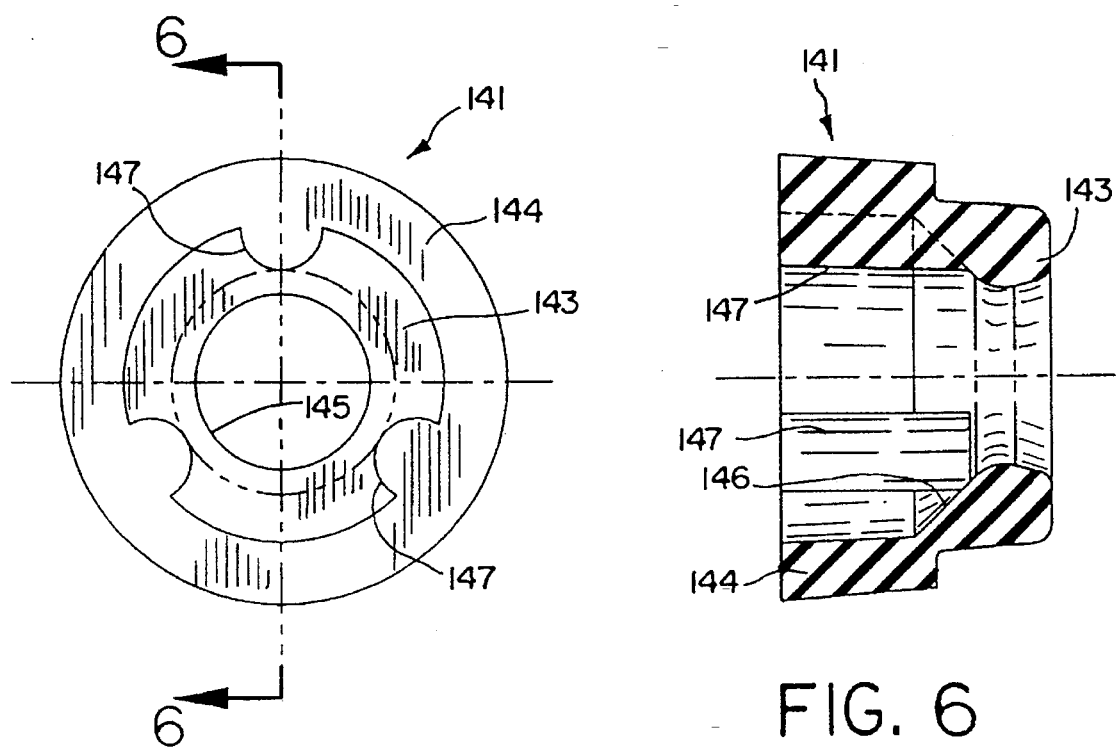
FIG. 5
FIG. 6

PNEUMATIC PRESSURE REGULATOR

PNEUMATIC PRESSURE REGULATOR

The herein described invention relates generally to pneumatic pressure regulators and, more particularly, to certain improvements in such regulators which enable more economical production of the regulators and improved performance.

BACKGROUND OF THE INVENTION

Various types of pneumatic pressure regulators are known. For low cost production, typically a major portion of the regulator's housing is formed by a casting which has various machining operations performed thereon. A common type of regulator has a valve seat machined into the casting and a bottom cap to retain the poppet and poppet return spring in the casting in operative relationship with respect to the valve seat. This open bottom design of regulator provides a desirable flow path through the regulator housing, in that the flow path has only a single right angle turn between the valve seat opening and the outlet port. This minimizes the pressure losses on the downstream side of the valve seat. However, machining operations have been required to form the valve seat in the casting as above indicated, threads for the bottom cap, O-ring sealing surfaces, etc. Also, replacement of the valve seat requires replacement of the entire casting, and the regulator requires assembly from two directions, i.e., from the top and bottom.

Also known are closed bottom regulators. In a typical closed bottom regulator, the valve seat is formed by a separate piece inserted into the casting. The valve seat is usually screwed into a threaded hole in the casting after insertion of the poppet and poppet return spring. Although having the advantage of being able to replace the valve seat without having to replace the entire casting, the typical flow path is more complicated on the downstream side of the valve seat and usually involves three right angle turns between the valve seat opening and the outlet port, with pressure losses on the downstream side of the valve seat resulting in lower flow rates when compared to the above mentioned open bottom regulators of comparable size.

Another type of closed bottom regulator was produced by applicants' assignee in the 1960's. In this regulator, the valve seat was provided on a cartridge inserted into a chamber in the main body of the housing and sealed to the main body at confronting planar surfaces by a O-ring disposed in a plane perpendicular to the longitudinal axis of the chamber. The flow path in this regulator was backwards to that of the above mentioned open bottom regulator wherein the valve seat is formed in the casting. However, pressure balancing on the poppet was accomplished at the upstream or high pressure side of the valve seat and the regulator was relatively expensive to manufacture.

It would be advantageous to provide a pneumatic pressure regulator with the main body of the housing formed by a casting that provides a flow path similar to the flow path in open bottom regulators while reducing the amount of machining, as by eliminating the need to machine, for example, a valve seat, threads for a bottom cap, and O-ring sealing surfaces. Moreover, it would be advantageous for such a regulator to have a valve seat that can be replaced without replacement of the entire casting and which enables assembly from one direction only with parts that are self-aligning.

Whether closed bottom or open bottom, pneumatic pressure regulators typically also include a bonnet attached to the main body. The bonnet usually contains a control spring that bears on a piston which closes a control chamber that is connected by an aspirating passage to the regulator's flow passage downstream of the valve seat. As shown in U.S. Pat. No. 3,926,208, the piston may be sealed to an outer wall of the control chamber by an elastomeric V-type packing ring. As further shown in the '208 patent, the piston may have a central relief passage therethrough that is normally closed by the end of a poppet stem. When the downstream or outlet pressure exceeds the set pressure of the regulator, the increased pressure in the control chamber will move the piston against the control spring to permit the poppet valve to close and further to unseat the end of the operator stem from the vent passage, thereby allowing fluid to vent from the control chamber to atmosphere via a side hole in the bonnet.

The use of packing and the like to seal the piston the outer wall of the control chamber introduces hysteresis during forward flow, as does the prior use of flat diaphragms. Too much hysteresis during forward flow is an undesirable characteristic. It would be advantageous to reduce this hysteresis, as by use of a rolling diaphragm to seal the piston. The reduction in hysteresis, however, has been found to allow the diaphragm assembly to vibrate during the pressure venting or relieving mode, usually resulting in a noise which is undesirable. Accordingly, it would be desirable to provide a regulator that has no or low hysteresis during forward flow and no undesirable vibration or noise during the venting mode.

SUMMARY OF THE INVENTION

The present invention provides various improvements in fluid pressure regulators that remedy the aforesaid drawbacks of existing regulator designs. The various features of the invention contribute to a low cost regulator that is easy to assemble from components that require less machining than existing regulator designs of comparable performance. One aspect of the invention is characterized by a fluid pressure regulator of closed bottom design that has a flow path similar to a conventional open bottom design, with other attendant advantages arising from the closed bottom design. Another aspect of the invention is characterized by a slant seal between a main body including the inlet and outlet ports and an insert body closing an open end of an intersecting chamber in the main body in which the valve element and valve seat are located. Yet another aspect of the invention is characterized by the valve seat insert having a wall portion separating the main flow path in the main body of the housing from a control chamber for the valve element and the wall portion including therein an aspirating passage for connecting the control chamber a portion of the main flow passage downstream of the valve seat. A further aspect of the invention is characterized by diaphragm piston assembly including an axially elongated mounting bead which hold the assembly to a bonnet body with other components of the bonnet retained in the bonnet body for easy assembly of the bonnet to the main body of the regulator housing. A still further aspect of the invention is characterized by a relief type regulator that has during forward flow low hysteresis arising from use of a rolling diaphragm and a unique vent seal that dampens vibrations to eliminate unwanted noise that might otherwise arise. The invention also provides a regulator that may be assembled for the most part without the need for tools.

More particularly and according to one aspect of the invention, a fluid pressure regulator comprises a housing including a main body having formed therein an inlet port, an outlet port and an intersecting chamber between the inlet and outlet ports. The intersecting chamber has an open end and an opposite end closed by an integral end wall portion of the main body, the open and closed ends of the intersecting chamber being aligned along an axis of the intersecting chamber. Disposed in the intersecting chamber is a valve seat insert that includes an insert body separating an upstream portion of the intersecting chamber from a downstream portion respectively in fluid communication with the inlet and outlet ports. The insert body has a valve seat surrounding a valve seat opening which is open and closed by the valve head of a valve element to control flow from the inlet port to the outlet port. A control chamber in the housing is connected by an aspirating passage to the downstream portion of the intersecting chamber, and a piston has one side thereof forming a movable wall of the control chamber. A control spring on the other side of the piston urges the piston toward the valve element, and a stem connects the valve element to the piston for movement of the valve element with the piston. The valve seat insert further includes an L-shape passage for directing the flow of fluid from the valve seat opening to the outlet port, one leg thereof extending from the valve seat opening and the other leg forming an axial continuation of the outlet port. In a preferred embodiment, the valve seat insert is a plastic molding and the main body is a casting.

According to another aspect of the invention, a fluid pressure regulator comprises a housing including a main body having formed therein an inlet port, an outlet port and an intersecting chamber between the inlet and outlet ports. Disposed in the intersecting chamber a valve seat insert having a insert body separating an upstream portion of the intersecting chamber from a downstream portion respectively in fluid communication with the inlet and outlet ports. A valve element has a valve head movable into and out of engagement with the valve seat for opening and closing the valve seat opening to control flow from the inlet port to the outlet port. The insert body further has a peripheral edge in supportive engagement with a sealing surface on the main body, and the peripheral edge and sealing surface are inclined to the longitudinal axis of the intersecting chamber and have a seal therebetween to provide fluid tight engagement of the insert body with the housing. In a preferred embodiment, the inlet and outlet ports are aligned along an axis perpendicular to the longitudinal axis of the intersecting chamber.

According to yet another aspect of the invention, a fluid pressure regulator comprises a housing having a main passage therethrough that has portions thereof upstream and downstream of a valve seat, and a valve element including a valve head movable into and out of engagement with the valve seat for opening and closing the valve seat opening to control flow through the main passage. A control chamber in the housing is connected by an aspirating passage to the downstream portion of the main passage, and a piston has one side thereof forming a movable wall of the control chamber. A valve stem interposed between the valve element and piston is engageable by the piston, and a control spring on the other side of the piston urges the piston toward the valve element. The piston includes a vent passage therein and a vent seal surrounding the vent passage. The vent seal has a seat portion engageable by an adjacent end of the stem to close the vent passage against escape of fluid from the control chamber, and an axially extending damper portion which resiliently laterally constrains the end of the stem over a limited range of axial movement of the stem. In a preferred embodiment, the damper portion has a tubular wall extending axially from the seat portion and at least one gripping rib protruding radially from the tubular wall for engaging a side of the stem, and the piston is sealed by a rolling diaphragm in engagement with a movable piston member including the vent passage.

According to a further aspect of the invention, a fluid pressure regulator comprises a housing including a main body and a bonnet body removably attached to the main body. The main body has a main passage therethrough that has portions thereof upstream and downstream of a valve seat, and a valve element includes a valve head movable into and out of engagement with the valve seat for opening and closing the valve seat opening to control flow through the main passage. A control chamber in the housing is connected by an aspirating passage to the downstream portion of the main passage, and a diaphragm piston assembly has a central piston forming a movable wall of the control chamber and a diaphragm having a peripheral mounting flange portion secured between a bonnet body and main body. A stem is interposed between the valve element and piston and engageable by the piston, and a set point adjustment mechanism includes a control spring on the other side of the piston for urging the piston toward the valve element and an adjustment device for adjusting the compression on the spring to enable adjustment of the regulator's set point. The mounting flange portion of the diaphragm includes a bead and the bonnet has an annular end face including an annular groove for the bead. The bead has an axial length greater than its radially width, and the width of the bead in its uncompressed state is sufficient, when inserted into the annular groove, to retain the diaphragm piston assembly and set point adjustment mechanism assembled to the bonnet body when the bonnet body is separate from the main body.

According to a still further aspect of the invention, a fluid pressure regulator comprises a housing including a main body having formed therein an inlet port, an outlet port and an intersecting chamber between the inlet and outlet ports. The intersecting chamber has an open end and a closed end, the open and closed ends of the intersecting chamber being aligned along an axis of the intersecting chamber. A valve seat insert, having a valve seat surrounding a valve seat opening, is disposed in the intersecting chamber and includes an insert body separating an upstream portion of the intersecting chamber from a downstream portion respectively in fluid communication with the inlet and outlet ports. A valve element includes a valve head on the upstream side of the insert body that is movable into and out of engagement with the valve seat for opening and closing the valve seat opening to control flow from the inlet port to the outlet port. A control chamber in the housing is separated by the valve seat insert from the intersecting chamber, and the valve seat insert includes an aspirating passage connecting the control chamber to the downstream portion of the intersecting chamber.

The foregoing and other features of the invention are hereinafter more fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

FIG. 4 is an enlarged cross-sectional view of the diaphragm piston assembly employed in the regulator.

FIG. 5 is an enlarged end view of a vent seal according to the invention.

FIG. 6 is a cross-sectional view of the vent seal of FIG. 5 taken along the line 6—6 of FIG. 5.

DETAILED DESCRIPTION

Figure 1:
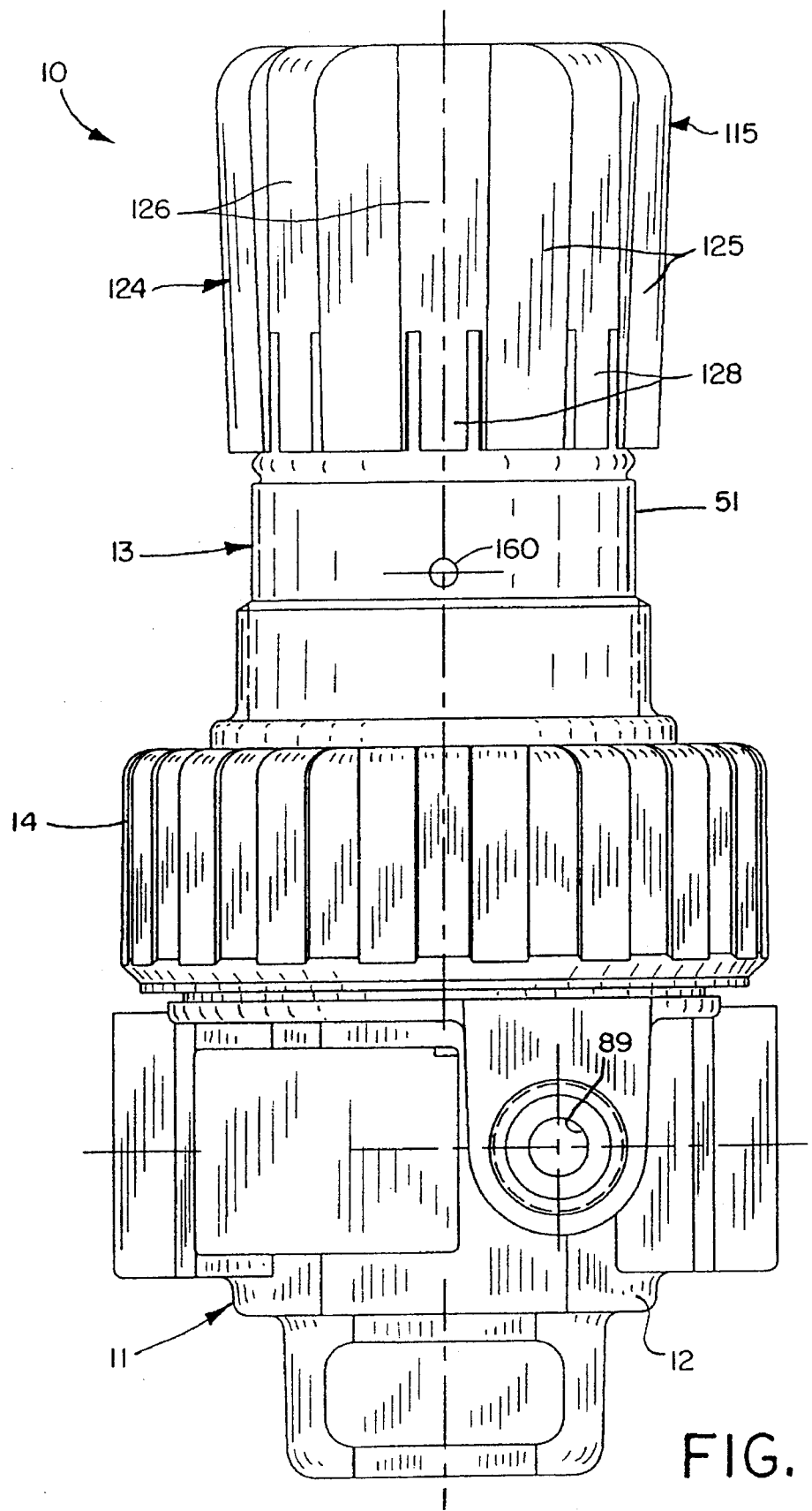
FIG. 1 is an elevational view of a pneumatic pressure regulator according to the invention.

Referring now in detail to the drawings and initially to FIG. 1, a preferred embodiment of pneumatic pressure regulator according to the invention, indicated generally at 10, comprises a housing 11 including a main body 12 to which a bonnet 13 is removably attached by a threaded collar 14.

Figure 2:
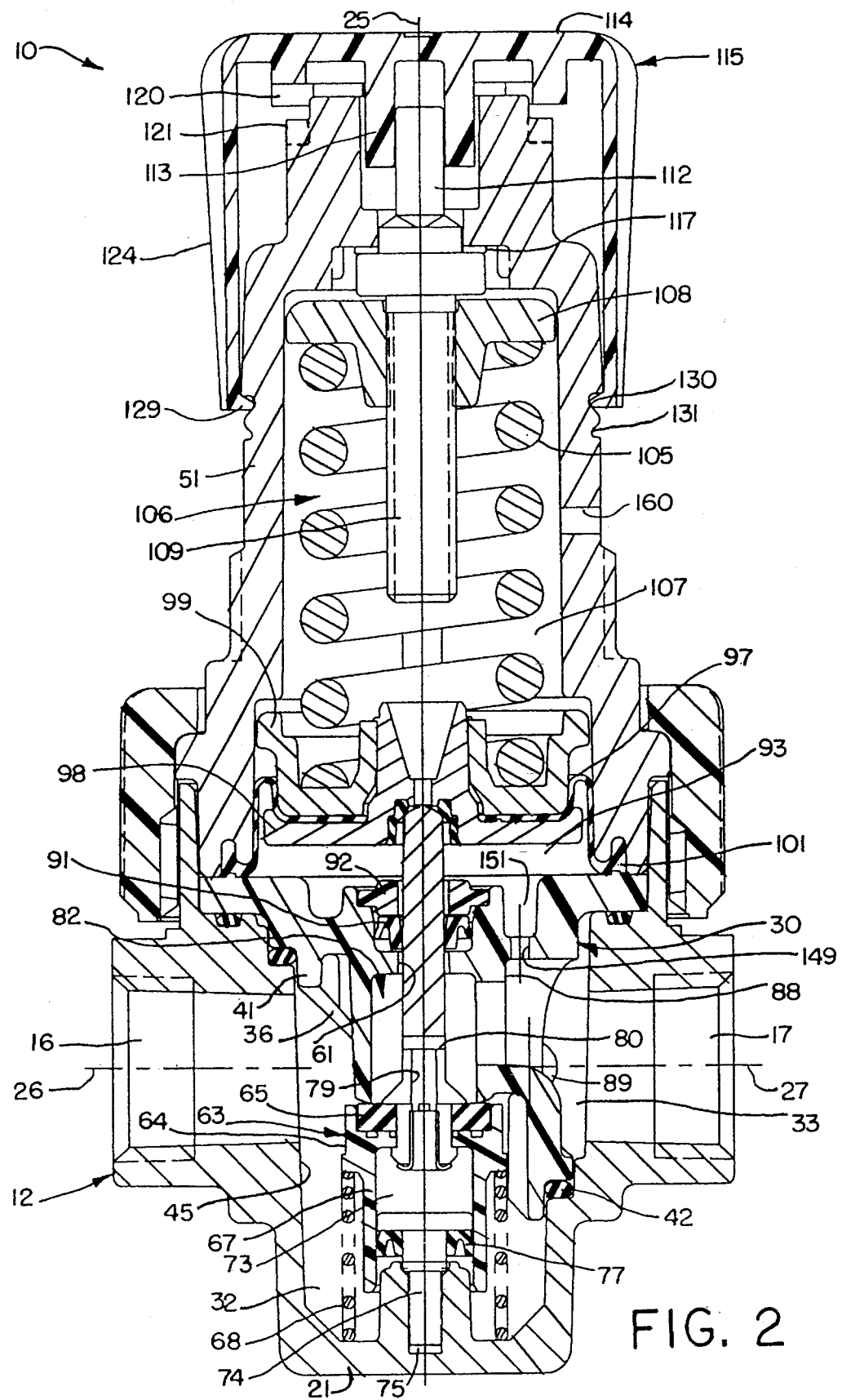
FIG. 2 is a cross-sectional view of the regulator.
Figure 3:
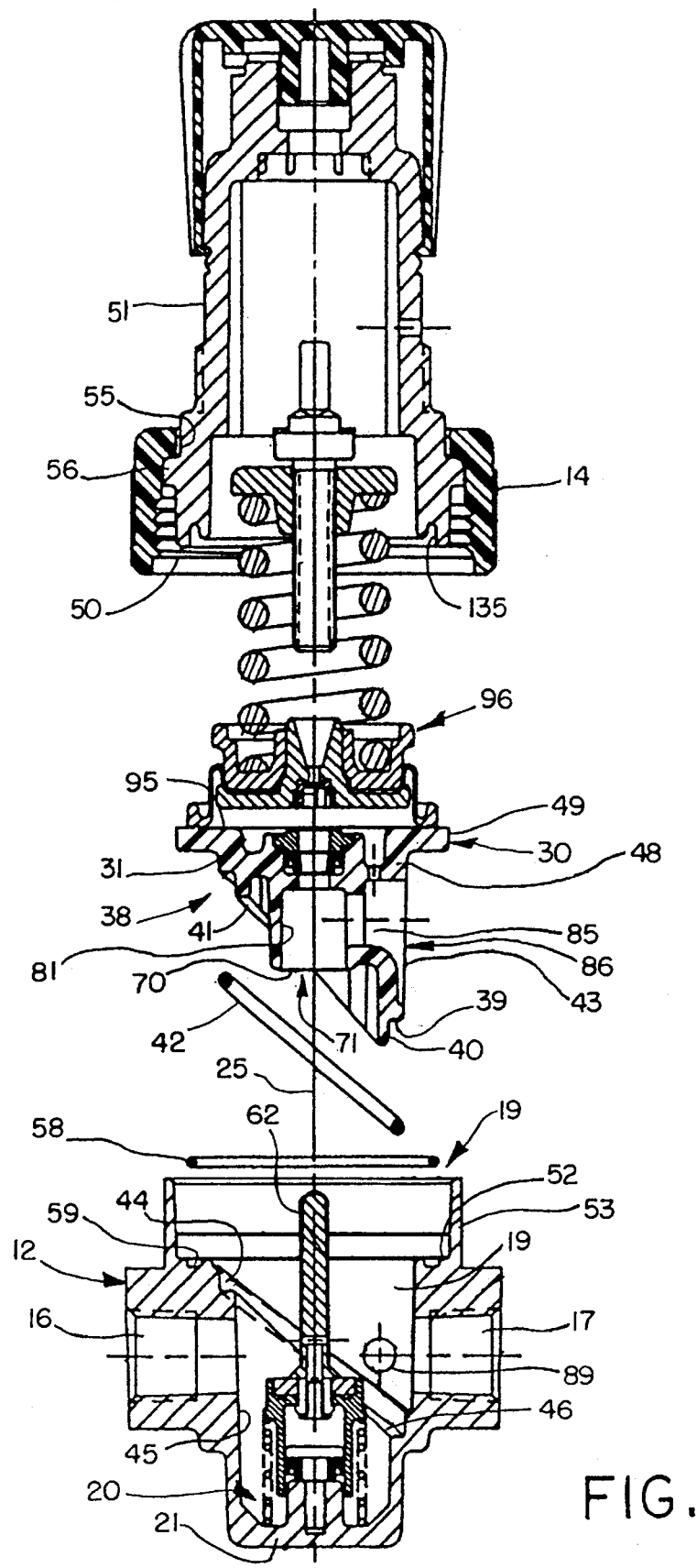
FIG. 3 is a cross-sectional view similar to FIG. 2, but with parts thereof shown in exploded relation.

As shown in FIGS. 2 and 3, the main body 12 has formed therein an inlet port 16, and outlet port 17 and an intersecting chamber 18. The intersecting chamber 18 has an open end 19 and an opposite end 20 closed by an integral end wall portion 21 of the main body 12. The open end 19 and closed end 20 are aligned along a longitudinal axis 25 of the intersecting chamber 18 which in the illustrated embodiment coincides with the longitudinal axis of the overall regulator. Also in the illustrated embodiment, the inlet and outlet ports have the axes 26 and 27 thereof aligned in a direction perpendicular to the longitudinal axis 25.

As will be appreciated by those skilled in the art, the regulator 10 may be oriented otherwise than as shown. However, for convenience in description and not by way of limitation, the relationship between and movement of parts or the regulator will be described with reference to the illustrated orientation of the regulator, as is customary in the art. Thus, the wall portion 21 is a bottom wall portion closing the bottom end 20 of the intersecting chamber 18, whereby the illustrated regulator is of the closed bottom type, as opposed to an open bottom type where the wall portion is formed by a screw-on cap that enables assembly of the poppet valve and return spring from the bottom of the main body. On occasion, there may be a need to provide a hole in the bottom wall such as for a pressure tap; however, the bottom wall would still be substantially closed as the hole does not provide for insertion of the poppet valve and spring into the intersecting chamber.

The open end 19 of the intersecting chamber 18 has inserted therethrough a valve seat insert 30. The valve seat insert 30 includes an insert body 31 preferably molded from reinforced plastic material that does not require any finishing or polishing. The insert body separates an upstream portion 32 of the intersecting chamber from a downstream portion 33 respectively in fluid communication with the inlet port 16 and outlet port 17. The insert body has a cylindrical portion 35 truncated at an axially inner edge portion 36 disposed along a plane inclined to the longitudinal axis 25 of the intersecting chamber 18. The inner edge portion has an axially inwardly opening groove 38 with an inclined bottom sealing surface 39 and a radially inner side surface 40 formed by an annular rim 41 that radially retains an O-ring 42 or other suitable annular seal on the sealing surface. As shown, the groove preferably is disposed adjacent a cylindrical wall surface 43 corresponding relatively closely in diameter to the corresponding cylindrical chamber wall surface 44 of the intersecting chamber, whereby the chamber wall surface 44 radially outwardly bounds the seal, As a result of its inclination, the sealing surface 39 is in the form of an ellipse which, as illustrated, has the longer axis thereof disposed in a plane parallel to the longitudinal axis 25 and axes 26 and 27 of the inlet and outlet ports 16 and 17.

When the valve seat insert 30 is inserted into the intersecting chamber 18, the annular rim 41 telescopes into a reduced diameter cylindrical portion 45 terminating at an inclined shoulder sealing surface 46 residing in a plane essentially parallel to the insert sealing surface. The insert sealing surface 39 and shoulder sealing surface 46 are opposed in a direction perpendicular to the inclined plane of the O-ring 42 and engage therebetween the O-ring 42 to provide a fluid tight seal that traverses the inner openings of the inlet and outlet ports 16 and 17.

The insert body 31 also has a disc-shape wall portion 48 that spans the open end 19 of the intersecting chamber 18 and has an annular flange portion 49 axially sandwiched between an annular end face 50 of a tubular bonnet body 51 and an annular shoulder 52 on the main body 12. The annular flange portion 49 is centered to the longitudinal axis 25 by a tubular wall portion 53 of the main body 12. The tubular wall portion 53 is externally threaded for mating with internal threads of the collar 14 when the latter is screwed onto the tubular wall. At its upper end, the collar 14 has a radially inwardly projecting annular lip 55 which overlaps and engages an annular shoulder or flange 56 on the bonnet body 51 for tightening the bonnet body against the main body 12 with the annular flange 49 of the valve insert body 31 sandwiched therebetween. The insert body is sealed to the main body by an O-ring 58 or other suitable annular seal received in an annular groove 59 in the annular shoulder.

At the center of the insert body 12 there is provided a passage 61 for a valve stem 62 to which a poppet valve 63 is attached as in the manner described in detail in U.S. Pat. No. 3,926,208. The poppet valve 63 includes a poppet member 64 having a recess containing an elastomeric washer 65. The poppet member has a depending skirt 67 surrounded by a spring 68 that is interposed between the bottom wall 21 of the main body and an annular shoulder on the poppet member 64. The spring constantly urges the poppet valve toward its closed position against a valve seat 70 in the insert body 31 that surrounds a valve seat opening 71.

The skirt 67 forms interiorly thereof a cylindrical balancing chamber 73 in which a retainer post 74 is located. The post 74 has one end secured to the bottom wall 21 of the main body by any suitable means. For example, the lower portion of the post may have self-tapping threads for screwing into a bore 75 in the bottom wall. At its other end, the post has a radially enlarged head to which an elastomeric V-type packing ring 77 or the like is mounted for sealing between the post and inner wall surface of the skirt. The chamber above the post is in fluid communication with a bore 79 in the stem 62 which extends to a cross bore 80 located in a middle region of a cylindrical portion 81 of a diverter passage 82 in the insert body 31 downstream of the valve seat 70. The region beneath the packing ring 77 is exposed to inlet pressure which activates the V-type packing ring.

The diverter passage 82 is generally L-shape making a single right angle turn from the valve seat opening 71 to the outlet port 17. More particularly, the cylindrical portion 81 forms an upstream leg of the diverter passage extending from the valve seat opening. The downstream leg 85 extends from one side of the cylindrical portion and terminates at a side opening 86 to form an axial continuation of the outlet port 17, i.e., at least a portion and preferably a substantial portion of the flow through the downstream leg of the diverter passages flows generally straight into the outlet portion. In the illustrated embodiment, a portion of the outflow also moves downwardly as well as outwardly into the lower region of the outlet port. Such an arrangement minimizes losses downstream of the valve seat and provides a flow path similar to a conventional open bottom regulator. As shown, the downstream leg 85, which forms a side outlet from the cylindrical chamber 81, has an initial section which opens at a shoulder 88 into a larger cross-sectional area which opens to the side of the valve seat insert at the opening 86 aligned with the outlet port. This side outlet 86 also is in fluid communication with a gage port 89 formed in the side wall of the main body. As is typical, a gage port may be provided on both sides of the main body to provide alternative attachment locations for a pressure gage.

The stem 62 extends axially through and is guided by the bore 61 in a transverse central portion of the insert body. The stem passes through a packing chamber including an elastomeric V-type packing ring 91 or other suitable seal sealing the stem to the bore wall while permitting axial movement of the stem. A plastic retainer disc 92 is fixed as by ultrasonic welding or other suitable means in a counterbore in the insert body to hold the packing ring in place at an inner side of a control chamber 93.

In the illustrated embodiment, the control chamber 93 is primarily formed within the bonnet body 51 and is closed at its inner end by a transversely extending outer surface 95 of the insert body 31. The other end of the control chamber is closed by a diaphragm piston assembly 96. With additional reference to FIG. 4, the diaphragm piston assembly 96 includes an annular rolling diaphragm 97 of elastomeric material that may be reinforced by a fabric reinforcement through the full transverse extent thereof. The diaphragm 97 has a central portion sandwiched between an inner piston plate 98 and an outer piston plate 99 that may be staked or otherwise secured together. The diaphragm has a fold 100 intermediate the piston plates and an outer annular edge or mounting flange portion 101 secured between the bonnet body 51 and insert body 31 as shown in FIG. 2. Accordingly, the central portion of the diaphragm piston assembly corresponding to the piston plates may be viewed as a piston 103 and the outer peripheral edge portion of the diaphragm as a seal that seals the piston to the wall of the control chamber 93.

The piston 103 is engaged at the outer side thereof by a control spring 105 of a set point adjustment mechanism 106 located within an interior chamber 107 in the bonnet body 51. The opposite end of the control spring 105 is engaged by an adjustment nut 108 which is threaded on an adjustment screw 109. The adjustment screw 109 is held in the bonnet body against rotation while being movable axially. In the illustrated embodiment the adjustment nut has a polygonal shape defined by peripheral flats that interfere with corresponding flats on the interior wall of the bonnet body to prevent rotation of the nut, the flats preferably being formed integrally with the bonnet body which may be molded from plastic material.

The adjustment screw 109 has an upper post portion 112 of square or other non-circular cross-section extending telescopically into a socket 113 of corresponding cross-section. The socket 113 extends inwardly from the center of a top portion 114 of a knob 115. Turning the knob rotates the screw 109 to move the nut 108 downwardly or upwardly. As shown, a thrust bearing 117 may be interposed between an interior annular shoulder of the bonnet body and an enlarged collar on the adjustment screw.

The knob 115 also has on the underside of its top portion a circular array of teeth 120 which interlock with an array of teeth 121 on the top end of the bonnet body 51 when the knob is pushed down into a locked position. When the knob is pulled up to an unlocked position, the teeth disengage to permit turning of the knob for adjustment of the regulator's set point. During movement of the knob between it locked and unlocked positions, the socket 113 telescopically extends and retracts relative to the upper post 112 portion of the adjustment screw 109.

The knob 115 further has a skirt portion 124 depending from its generally circular top portion. As best shown in FIG. 1, the skirt portion 124 has axially extending rib portions 125 circumferentially alternating with relatively thinner web portions 126. At their lower ends, each web portion 126 has a pair of axially extending slits defining therebetween a finger 128 that is free to flex radially at its lower end which has a radially inwardly protruding detent 129 as shown in FIGS. 2 and 3. The detent 129 is engageable in either one of a pair of axially spaced apart annular grooves 130 and 131 on the bonnet body to form stops for the unlocked and locked positions of the knob. The upper groove 130 is positioned to hold the knob in its unlocked position with the teeth 120 disengaged from the teeth 121 to permit turning of the knob. The lower groove 131 is positioned to hold the knob with the teeth 120 engaged with the teeth 121 to prevent turning the knob.

As will be appreciated, the knob 115 can be easily assembled to the bonnet body 51 by axially telescopically slipping the skirt portion 124 of the knob over the upper end of the bonnet body. The fingers 128 will resiliently flex outwardly to permit such passage and then snap into one of the stop grooves 130 and 131 when aligned therewith. The other bonnet components can also be easily assembled into the bonnet body from the opposite end. The set point adjustment mechanism 106, consisting of the adjustment screw 109, nut 108 and control spring 105 in the illustrated embodiment, may be inserted axially into the interior of the bonnet body and then the diaphragm piston assembly 96 placed thereover to capture the set point adjustment mechanism in the bonnet body.

In the illustrated embodiment, as is preferred, the diaphragm 97 is provided with an annular bead 134 on the diaphragm mounting flange circumference. The bead 134 has an axial length greater than its radial thickness to provide for secure retention in a bead groove 135 in the annular bottom surface 50 of the bonnet body 51. The bead and bead groove are relatively sized to provide for a tight fit that will secure the diaphragm assembly to the bonnet body and also hold the set point adjustment mechanism in the bonnet body as well. This greatly facilitates assembly of the bonnet components and the bonnet to the main body 12.

In addition, the bead provides a sealed joint between the bonnet body and the flange 49 of the valve seat insert 30 in the main body 12. As shown, the valve seat insert flange 49 may be provided with an annular sealing bead radially coextensive with the flange bead 134 of the diaphragm 97. This sealed joint configuration permits hand tightening of the collar while still providing a tight fluid seal. The collar is preferably provided with finger gripping ribs or the like to prevent slippage of the collar in the assembler's hand when the collar is being tightened or untightened without the aid of a tool.

As further shown in FIG. 4, the piston 103 has a central relief or vent passage 140. The vent passage 140 has a counterbore in which an elastomeric vent seal 141 is retained. The vent seal 141, further shown in FIGS. 5 and 6, is cup shape having an annular bottom wall 143 forming a valve seat and a tubular side wall or skirt 144. The valve seat has a central opening 145 surrounded by a conical portion 146 that is engaged by the rounded end of the stem 62 to close the opening 145. The stem moves telescopically in the tubular wall 144 which is provided with damper means for engaging the stem to dampen movement of the stem relative to the valve seal. In the illustrated embodiment, the damper means is provided by a plurality of axial ribs 147 protruding radially inwardly from the tubular wall to engage the sides of the stem. There are three circumferentially spaced apart, axially extending ribs in the illustrated embodiment. When the stem is inserted into the seal, the ribs are compressed and resiliently radially constrain and frictionally engage the stem to dampen any vibratory movement of the stem. As above mentioned, the low hysteresis arising from use of a rolling diaphragm may allow the diaphragm assembly to vibrate during the hereinafter discussed relief mode. The illustrated vent seal dampens these vibrations to eliminate unwanted noise that might otherwise arise. It also is noted that this arrangement does not introduce unwanted hysteresis during forward flow, as the stem remains seated and does not move relative to the diaphragm assembly during forward flow.

As previously indicated, the piston 103 and outer surface 95 of the valve seat 30 insert form therebetween the control chamber 93. An aspirating passage 149 in the disk portion 48 of the insert body connects the control chamber with the outlet portion 85 of the diverter passage 82 in the valve seat insert. As shown, the control chamber end of the aspirating passage 149 opens to an annular channel 151 in the outer surface of the valve seat insert. The other end of the aspirating passage opens to the outlet portion of the diverter passage near the shoulder 88 so as to avoid direct fluid flow into the aspirating passage. In an alternative arrangement, an aspirating tube may extend into the outlet portion of the diverter passage and have an opening positioned centrally in the outlet portion preferably on the downstream side of the aspirating tube. This tube may be molded integrally with the valve seat insert to facilitate assembly and minimize the number of parts.

A major advantage afforded by the present invention is the reduction of the number of machining operations. As is preferred, the main body 12 is formed by casting as by using a conventional die casting process. The illustrated casting is die casted from zinc and the only required machining operations are tapping the threads for the gage port or ports 89, the inlet port 16, and the outlet port 17. The other described features may be formed directly from the casting operation, including the inclined sealing surface 46 as it opens axially in relation to the associated intersecting passage 18. Accordingly, there is no requirement to machine the inclined sealing surface, or the valve seat, threads for the bottom cap or other O-ring sealing surfaces.

In addition, the illustrated design permits assembly of the various components to the main body 12 in a single direction, i.e., from the top in FIGS. 2 and 3. This is further enabled by the valve seat insert 30 which has the body 31 thereof preferably molded as a single piece from a suitable plastic. The insert body may be easily dropped into the intersecting chamber 18 through the open end 19 thereof, after the poppet valve 63 and associated components have been assembled either to the insert or placed in the intersecting chamber on the bottom wall 21 of the main body. For example, the post 74 and seal 77 may be secured to the bottom wall and the return spring 68 placed therearound, while the poppet valve and stem may be held to the insert by the gripping force exerted by the packing ring 91 on the stem. Then, during insertion of the insert, the poppet valve skirt can be slipped telescopically over the post and seal assembly and inside the spring. After this, the bonnet, preassembled as above described, may be attached to the main body by the collar. As will be appreciated, the insert will self-align in the main body as the inclined sealing surfaces thereof move into engagement. Attachment of the bonnet to the body secures the drop-in components in place.

Operation of the regulator 10 is substantially similar to conventional open bottom regulators. When there is no fluid pressure in either the inlet or outlet ports 16 and 17, the control spring 105 moves the piston 103, stem 62 and poppet valve 63 downwardly to an open position against the relatively light pressure of the valve restoring spring 68. This movement is limited by bottoming of the piston against the top of the valve seat insert 30.

When fluid flows through the regulator 10, its rate of flow depends on the resistance to flow exerted by the fluid pressure operated unit or units to which regulated fluid flow is being delivered. If the resistance is low, the rate of flow is high in order for the pressure in the outlet port 17 to build up to the selected regulated value determined by the setting of the control spring 105. The pressure downstream of the valve seat 70 is sensed and transmitted by the aspirating passage 149 to the control chamber 93 where it will act on the piston in opposition to the control spring biasing force. When this pressure exceeds the control spring biasing force acting on the piston, the piston will be urged upwardly while the stem and poppet follow under the force exerted by the restoring spring and/or any overbalance in the balancing chamber 73 which is connected to the diverter passage in the insert body via the passageway 79 in the stem. As the piston is urged upwardly, the poppet valve will close until the pressure in the control chamber counterbalances the spring force.

When the pressure in the outlet port 17 exceeds the set value, this pressure increase will be transmitted to the control chamber 93 to raise the piston 103 enough to allow the poppet valve 63 to close. Any further increase in pressure in the outlet port will cause the piston to rise further to unseat the stem 62 from the relief valve seat seal 141. This permits venting of fluid from the outlet port via the aspirating hole and control chamber to the interior of the bonnet which has a vent opening 160 permitting fluid escape to the atmosphere and also for allowing exposure of the back side of the piston to atmospheric pressure. When the pressure in the outlet is below the set value, the correspondingly reduced pressure in the control chamber will allow the control spring to move the piston downwardly to increase the poppet valve opening and allow the pressure to increase in the outlet port.

Although the invention has been shown and described with respect to a certain preferred embodiment, alterations and modifications will no doubt occur to others skilled in the art upon the reading and understanding of this specification. The present invention includes all such alterations and modifications falling within the spirit of the herein described invention.

What is claimed is:

1. A fluid pressure regulator comprising
   a housing including a main body having formed therein an inlet port, an outlet port and an intersecting chamber between the inlet and outlet ports, the intersecting chamber having a longitudinal axis,
   a valve seat insert disposed in the intersecting chamber and having a insert body separating an upstream portion of the intersecting chamber from a downstream portion respectively in fluid communication with the inlet and outlet ports, the insert body having a valve seat surrounding a valve seat opening, a valve element including a valve head movable into and out of engagement with the valve seat for opening and closing the valve seat opening to control flow from the inlet port to the outlet port, the insert body having a peripheral edge in supportive engagement with a sealing surface on the main body, the peripheral edge and sealing surface being inclined to the longitudinal axis of the intersecting chamber and having a seal therebetween to provide fluid tight engagement of the insert body with the housing, and the insert body including a passage for directing the flow of fluid from the valve seat to the outlet port.

2. A fluid pressure regulator as set forth in claim 1, wherein the passage in the insert body is generally L-shape.

3. A fluid pressure regulator comprising a housing including a main body having formed therein an inlet port, an outlet port and an intersecting chamber between the inlet and outlet ports, the intersecting chamber having a longitudinal axis, a valve seat insert disposed in the intersecting chamber and having a insert body separating an upstream portion of the intersecting chamber from a downstream portion respectively in fluid communication with the inlet and outlet ports, the insert body having a valve seat surrounding a valve seat opening, a valve element including a valve head movable into and out of engagement with the valve seat for opening and closing the valve seat opening to control flow from the inlet port to the outlet port, the insert body having a peripheral edge in supportive engagement with a sealing surface on the main body, the peripheral edge and sealing surface being inclined to the longitudinal axis of the intersecting chamber and having a seal therebetween to provide fluid tight engagement of the insert body with the housing, and further comprising a control chamber in the housing and connected by an aspirating passage to the downstream portion of the intersecting chamber, a piston having one side thereof forming a movable wall of the control chamber, a stem interposed between the valve element and piston and engageable by the piston, a control spring on the other side of the piston for urging the piston toward the valve element, the piston including a vent passage therein and a vent seal surrounding the vent passage, the vent seal having a seat portion engageable by an adjacent end of the stem to close the vent passage against escape of fluid from the control chamber, and an axially extending damper portion which resiliently laterally constrains the end of the stem over a limited range of axial movement of the stem.

4. A fluid pressure regulator comprising a housing including a main body having formed therein an inlet port, an outlet port and an intersecting chamber between the inlet and outlet ports, the intersecting chamber having a longitudinal axis, a valve seat insert disposed in the intersecting chamber and having a insert body separating an upstream portion of the intersecting chamber from a downstream portion respectively in fluid communication with the inlet and outlet ports, the insert body having a valve seat surrounding a valve seat opening, a valve element including a valve head movable into and out of engagement with the valve seat for opening and closing the valve seat opening to control flow from the inlet port to the outlet port, the insert body having a peripheral edge in supportive engagement with a sealing surface on the main body, the peripheral edge and sealing surface being inclined to the longitudinal axis of the intersecting chamber and having a seal therebetween to provide fluid tight engagement of the insert body with the housing, and further comprising a control chamber in the housing and connected by an aspirating passage to the downstream portion of the intersecting chamber, a diaphragm piston assembly having a central piston forming a movable wall of the control chamber and a diaphragm having a peripheral mounting flange portion secured between a bonnet body and main body, a stem interposed between the valve element and piston and engageable by the piston, a set point adjustment mechanism including a control spring on the other side of the piston for urging the piston toward the valve element and an adjustment device for adjusting the compression on the spring to enable adjustment of the regulator's set point, the mounting flange portion of the diaphragm including a bead and the bonnet having an annular end face including an annular groove for the bead, the bead having an axial length greater than its radial width, and the width of the bead in its uncompressed state being sufficient, when inserted into the annular groove, to retain the diaphragm piston assembly and set point adjustment mechanism assembled to the bonnet body when the bonnet body is separate from the main body.

5. A fluid pressure regulator comprising a housing including a main body having formed therein an inlet port, an outlet port and an intersecting chamber between the inlet and outlet ports, the intersecting chamber having an open end and a closed end, the open and closed end of the intersecting chamber being aligned along an axis of the intersecting chamber, and the inlet and outlet ports intersecting the intersecting chamber at respective openings that are aligned with one another along an axis perpendicular to the axis of the intersecting chamber, a valve seat insert disposed in the intersecting chamber and including an insert body separating an upstream portion of the intersecting chamber from a downstream portion respectively in fluid communication with the inlet and outlet ports, the insert body having a valve seat surrounding a valve seat opening, a valve element including a valve head on the upstream side of the insert body and movable into and out of engagement with the valve seat for opening and closing the valve seat opening to control flow from the inlet port to the outlet port, a control chamber in the housing and connected by an aspirating passage to the downstream portion of the intersecting chamber, a piston having one side thereof forming a movable wall of the control chamber, a control spring on the other side of the piston for urging the piston toward the valve element, a stem connecting the valve element and the piston, the valve seat insert including a generally L-shape passage for directing the flow of fluid from the valve seat opening to the outlet port, one leg thereof extending from the valve seat opening and the other leg forming an axial continuation of the outlet port.

6. A fluid pressure regulator comprising a housing including a main body having formed therein an inlet port, an outlet port and an intersecting chamber between the inlet and outlet ports, the intersecting chamber having a longitudinal axis, a valve seat insert disposed in the intersecting chamber and including an insert body separating an upstream portion of the intersecting chamber from a downstream portion respectively in fluid communication with the inlet and outlet ports, the insert body having a valve seat surrounding a valve seat opening, a valve element including a valve head on the upstream side of the insert body and movable into and out of engagement with the valve seat for opening and closing the valve seat opening to control flow from the inlet port to the outlet port, and wherein the valve seat insert and main body have opposed sealing surfaces inclined to the axis of the intersecting chamber, and further comprising an annular seal between the opposed sealing surfaces, the opposed sealing surfaces being arranged such that the upstream and downstream portions of the intersecting chamber are sealed from one another by the annular seal.

7. A fluid pressure regulator as set forth in claim 6, wherein the inlet and outlet ports are aligned along an axis perpendicular to the longitudinal axis of the intersecting chamber.

8. A fluid pressure regulator as set forth in claim 6, wherein the insert body includes an aspirating hole.

9. A fluid pressure regulator as set forth in claim 6, wherein the opposed sealing surfaces are axially opposed.

10. A fluid pressure regulator as set forth in claim 6, wherein the main body is a metal casting and the insert is molded from plastic.

11. A fluid pressure regulator as set forth in claim 6, wherein the intersecting chamber has an open end and a closed end, and the open and closed ends of the intersecting chamber are aligned along an axis of the intersecting chamber, and further comprising:

a control chamber in the housing and connected by an aspirating passage to the downstream portion of the intersecting chamber, a piston having one side thereof forming a movable wall of the control chamber, a control spring on the other side of the piston for urging the piston toward the valve element, and a stem connecting the valve element and the piston, and the valve seat insert including a generally L-shape passage for directing the flow of fluid from the valve seat opening to the outlet port, one leg thereof extending from the valve seat opening and the other leg forming an axial continuation of the outlet port.

12. A fluid pressure regulator as set forth in claim 11, wherein the valve seat insert includes a wall portion separating the L-shape passage from the control chamber.

13. A fluid pressure regulator as set forth in claim 12, wherein the wall portion includes an aspirating hole.

14. A fluid pressure regulator comprising a housing having a main passage therethrough that has portions thereof upstream and downstream of a valve seat, a valve element including a valve head movable into and out of engagement with the valve seat for opening and closing the valve seat opening to control flow through the main passage, a control chamber in the housing and connected by an aspirating passage to the downstream portion of the main passage, a piston having one side thereof forming a movable wall of the control chamber, a chamber wall separating the control chamber from the downstream portion of the main passage, a stem interposed between the valve element and piston and engageable by the piston, the stem passing through an opening in the chamber Wall, a control spring on the other side of the piston for urging the piston toward the valve element, the piston including a vent passage therein and a vent seal surrounding the vent passage, the vent seal having a seat portion engageable by an adjacent end of the stem to close the vent passage against escape of fluid from the control chamber, and an axially extending damper portion which resiliently laterally constrains the end of the stem over a limited range of axial movement of the stem.

15. A fluid pressure regulator as set forth in claim 14, including a rolling diaphragm in engagement with a movable piston member including the vent passage.

16. A fluid pressure regulator comprising a housing having a main passage therethrough that has portions thereof upstream and downstream of a valve seat, a valve element including a valve head movable into and out of engagement with the valve seat for opening and closing the valve seat opening to control flow through the main passage, a control chamber in the housing and connected by an aspirating passage to the downstream portion of the main passage, a piston having one side thereof forming a movable wall of the control chamber, a stem interposed between the valve element and piston and engageable by the piston, a control spring on the other side of the piston for urging the piston toward the valve element, the piston including a vent passage therein and a vent seal surrounding the vent passage, the vent seal having a seat portion engageable by an adjacent end of the stem to close the vent passage against escape of fluid from the control chamber, and an axially extending damper portion which resiliently laterally constrains the end of the stem over a limited range of axial movement of the stem, and wherein the damper portion has a tubular wall extending axially from the seat portion and at least one gripping rib protruding radially from the tubular wall for engaging a side of the stem.

17. A fluid pressure regulator as set forth in claim 16, wherein the at least one gripping rib includes a plurality of circumferentially spaced apart gripping ribs protruding radially from the tubular wall for engaging a side of the stem.

18. A fluid pressure regulator comprising a housing including a main body and a bonnet body removably attached to the main body, the main body having a main passage therethrough that has portions thereof upstream and downstream of a valve seat, a valve element including a valve head movable into and out of engagement with the valve seat for opening and closing the valve seat opening to control flow through the main passage, a control chamber in the housing and connected by an aspirating passage to the downstream portion of the main passage, a diaphragm piston assembly having a central piston forming a movable wall of the control chamber and a diaphragm having a peripheral mounting flange portion secured between a bonnet body and main body, a stem interposed between the valve element and piston and engageable by the piston, a set point adjustment mechanism including a control spring on the other side of the piston for urging the piston toward the valve element and an adjustment device for adjusting the tension on the spring to enable adjustment of the regulator's set point, the mounting flange portion of the diaphragm including a bead and the bonnet having an annular end face including an annular groove for the bead, the bead having an axial length greater than its radial width, and the width of the bead in its uncompressed state being sufficient, when inserted into the annular groove, to retain the diaphragm piston assembly and set point adjustment mechanism assembled to the bonnet body when the bonnet body is separate from the main body.

19. A fluid pressure regulator comprising a housing including a main body having formed therein an inlet port, an outlet port and an intersecting chamber between the inlet and outlet ports, the intersecting chamber having an open end and a closed end, the open and closed ends of the intersecting chamber being aligned along an axis of the intersecting chamber, a valve seat insert disposed in the intersecting chamber and including an insert body separating an upstream portion of the intersecting chamber from a downstream portion respectively in fluid communication with the inlet and outlet ports, the insert body having a valve seat surrounding a valve seat opening, a valve element including a valve head on the upstream side of the insert body and movable into and out of engagement with the valve seat for opening and closing the valve seat opening to control flow from the inlet port to the outlet port, a control chamber in the housing separated by a wall of the valve seat insert from the intersecting chamber, the valve seat insert including an aspirating passage connecting the control chamber to the downstream portion of the intersecting chamber, a piston having one side thereof forming a movable wall of the control chamber, a control spring on the other side of the piston for urging the piston toward the valve element, and a stem connecting the valve element and the piston, the stem passing through an opening in the wall of the valve seat.

20. A fluid pressure regulator as set forth in claim 19, wherein the valve seat insert has an annular flange portion, and further comprising a bonnet body including a control spring chamber for housing the control spring, and a collar for removably holding the bonnet body to the main body with the annular flange portion of the valve seat insert held between the bonnet body and main body.

21. A fluid pressure regulator comprising a housing including a main body and a bonnet body removably attached to the main body by a collar, the main body having an externally threaded portion and the collar being internally threaded for screwing onto the externally threaded portion of the main body by hand turning the collar without the aid of a tool, the collar being rotatable relative to the bonnet body and cooperative with the bonnet body to hold the bonnet body to the main body;

the main body further having a main passage therethrough that has portions thereof upstream and downstream of a valve seat, a valve element including a valve head movable into and out of engagement with the valve seat for opening and closing the valve seat opening to control flow through the main passage, a control chamber in the housing and connected by an aspirating passage to the downstream portion of the main passage, a diaphragm piston assembly having a central piston forming a movable wall of the control chamber and a diaphragm having a peripheral mounting flange portion secured between a bonnet body and main body, a stem interposed between the valve element and piston and engageable by the piston, a set point adjustment mechanism including a control spring on the other side of the piston for urging the piston toward the valve element and an adjustment device for adjusting the tension on the spring to enable adjustment of the regulator's set point, the mounting flange portion of the diaphragm including a bead and the bonnet having an annular end face including an annular groove for the bead, the bead having an axial length greater than its radial width and being press fit into the into the annular groove and engageable at its side opposite the groove against an annular surface of the main body to form a fluid tight seal therebetween.

\* \* \* \* \*